A. T. STURT.
CONNECTING ROD BEARING.
APPLICATION FILED NOV. 16, 1910.
1,027,293.
Patented May 21, 1912.
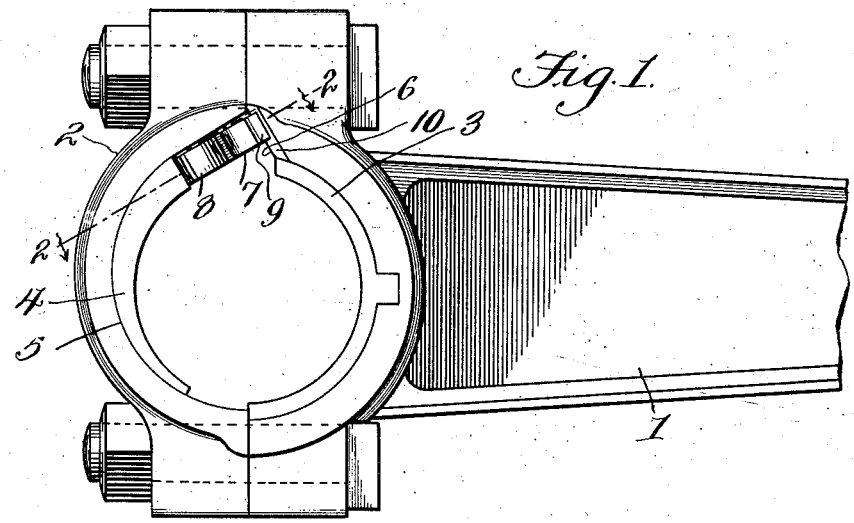
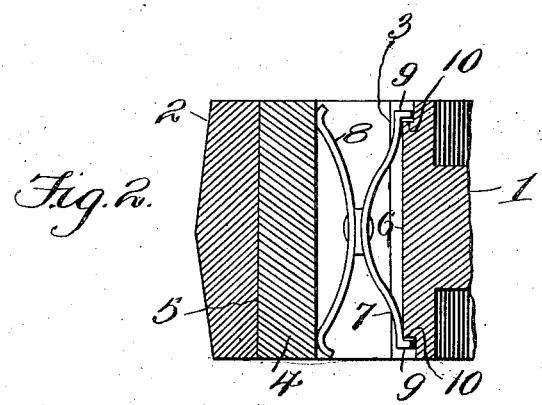
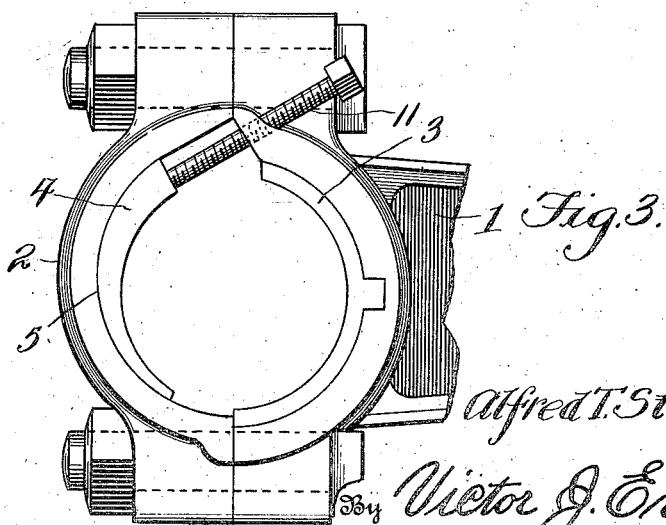
Inventor
Alfred T. Sturt
Witnesses
J. L. Wright,
N. B. Hillyard
By Victor J. Evans
Attorney

UNITED STATES PATENT OFFICE.

ALFRED T. STURT, OF FLINT, MICHIGAN.

CONNECTING-ROD BEARING.

1,027,293.   Specification of Letters Patent.   Patented May 21, 1912.

Application filed November 16, 1910. Serial No. 592,729.

*To all whom it may concern:*

Be it known that I, ALFRED T. STURT, a citizen of the United States, residing at Flint, in the county of Genesee and State of Michigan, have invented new and useful Improvements in Connecting-Rod Bearings, of which the following is a specification.

The present invention is primarily designed to provide an adjustable bearing for connecting rods, whereby wear may be taken up, thereby obviating rattle and lost motion.

While the invention is designed most especially for connecting rods and like parts, it may be readily adapted for bearings generally requiring adjustment to compensate for wear.

The invention consists of a bearing block of wedge form and curved throughout its length on the arc of a circle and adjustable in its circumferental length so as to take up wear by a wedging action.

The invention further contemplates novel means for adjusting the bearing block either automatically or at the will of an attendant by manipulating a setting appliance, such as a screw or analogous part.

The invention consists of the novel features, details of construction and combination of parts, which hereinafter will be more particularly set forth, illustrated in the accompanying drawing, and pointed out in the appended claims.

Referring to the drawing, forming a part of the application, Figure 1 is a side view of an end portion of a connecting rod provided with an adjustable bearing block embodying the invention. Fig. 2 is a detail section on the line 2—2 of Fig. 1. Fig. 3 is a view similar to Fig. 1 of a modification.

Corresponding and like parts are referred to in the following description, and indicated in all the views of the drawing, by the same reference characters.

The numeral 1 designates a connecting rod, pitman or the like and 2 a cap fitted thereto, said connecting rod being designed to receive a wrist pin, crank or the like cooperating therewith. The bearing fitted in the opening at the end of the connecting rod or like part is made in two sections 3 and 4, one of which is stationary and the other movable. The sections or parts of the bearing may be formed of any material such as brass, Babbitt metal or other composition usually employed for this purpose.

The section or part 3 of the bearing is fixed and is of uniform thickness throughout its length. The section or part 4 is tapered or of a wedge form throughout its circumferential length and is adjustable so as to vary the size of the opening whereby provision is had for taking up wear and insuring a close fit between the connecting rod and the part fitted in the opening thereof. The opening provided in the connecting rod to receive the pin, crank or like part has a portion of its wall eccentrically formed, as indicated at 5, whereby a seat is provided to receive the section or part 4 of the bearing. When the parts or sections of the bearing are in place the opening closed thereby is of circular form to correspond with the pin, crank or like part to be fitted therein. The part 4 is adjustable on the eccentric seat 5 and this adjustment may be effected automatically or at intervals, as may be required. The automatic adjustment is accomplished by means of a spring which is interposed between the large end of the bearing block 4 and the shoulder 6 formed at the end of the seat 5 corresponding to the depressed part thereof. The spring may be of any formation and, as indicated most clearly in Fig. 2, consists of two members 7 and 8, each of bow or semi-elliptic form and arranged with their middle parts in close relation and with their ends separated and adapted to obtain a bearing upon the end of the bearing block 4 and the shoulder 6. The extremities of the spring 7 are bent, as indicated at 9, and engage shoulders 10 formed by cutting away end portions of the shoulder 6. By this means the spring is prevented from lateral displacement. When the parts are assembled the members of the spring are compressed and normally tend to expand and exert an end thrust upon the wedge shaped bearing block 4 so as to move the same circumferentially upon the seat 5. By this means any wear between the bearing block and the part fitted therein is automatically taken up.

In the modification shown in Fig. 3, the bearing block 4 is adapted to be moved by means of a set screw 11 which replaces the spring, said set screw being threaded into a part of the connecting rod and adapted to be turned when required to move the bearing block 4 so as to take up wear and prevent any play or noise such as is incident to a loose joint. The parts are assembled so that the relative movement between the bearing and the part fitted therein is in an opposite direction to the movement of the part 4 of the bearing when adjusting the same to take up wear, thereby preventing binding or wedging of the pin, crank or like part.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention, what I claim as new is:—

1. In combination, a connecting rod having an opening for the reception of a crank pin, said opening having a portion of its wall eccentrically formed to provide a seat, and having a shoulder at the end of the eccentric seat corresponding to the deepest part thereof, a bearing block having a portion formed on the arc of a circle and tapered in its length and fitted upon said eccentric seat, and means for adjusting said bearing block circumferentially upon its seat and interposed between the larger end of the bearing block and the shoulder formed at the deeper end of the seat.

2. In combination, a connecting rod having an opening and having a portion of the wall of said opening made eccentric, and formed with a shoulder, a two-part bearing fitted within said opening and having a part formed on the arc of a circle and tapered in its circumferential length and placed upon the eccentric portion of the wall of the opening and adjustable thereon, and a spring interposed between the adjustable part of the bearing and the shouldered part formed in the opening and normally tending to move the adjustable part of the bearing in the direction of its circumferential length to automatically take up wear between it and the part fitted within the bearing.

3. In combination, a connecting rod having an opening and having a portion of the opening made eccentric and having a shoulder at the deepest end of the eccentric portion, a bearing block fitted within the opening and comprising a part curved and tapered throughout its length, and a bow spring interposed between the larger end of the tapered part of the bearing block and the said shoulder and having projecting portions at its ends to engage the sides of the connecting rod to retain the said spring in place against lateral movement.

In testimony whereof I affix my signature in presence of two witnesses.

ALFRED T. STURT.

Witnesses:
ELMA E. EASTON,
W E. McINNES.